United States Patent [19]

Parkinson

[11] Patent Number: 5,456,123
[45] Date of Patent: Oct. 10, 1995

[54] STATIC TORQUE MEASUREMENT FOR ROTATABLE SHAFT

[75] Inventor: James R. Parkinson, Vergennes, Vt.

[73] Assignee: Simmonds Precision Products, Inc., Akron, Ohio

[21] Appl. No.: 187,663

[22] Filed: Jan. 26, 1994

[51] Int. Cl.⁶ ........................................... G01L 3/00
[52] U.S. Cl. ............................... 73/862.326; 73/3
[58] Field of Search .................. 73/862.326, 862.327, 73/862.328, 862.329, 3, 848, 849; 340/671, 672

[56] References Cited

U.S. PATENT DOCUMENTS

| | | | |
|---|---|---|---|
| 1,331,069 | 2/1920 | Leboucher | 73/862.326 |
| 3,122,639 | 2/1964 | McCauley et al. | 73/862.326 |
| 3,190,125 | 6/1965 | Holz | 73/432 |
| 3,548,649 | 12/1970 | Parkinson | 73/136 |
| 3,641,535 | 2/1972 | Knopf | 340/195 |
| 3,827,807 | 8/1974 | Fletcher et al. | 356/141 |
| 3,863,235 | 1/1975 | McKee et al. | 340/195 |
| 3,876,326 | 4/1975 | Weitz | 415/17 |
| 4,199,718 | 4/1980 | Ikeda et al. | 324/158 MG |
| 4,488,443 | 12/1984 | Parkinson | 73/862.33 |
| 4,518,917 | 5/1985 | Oates et al. | 324/207 |
| 4,590,806 | 5/1986 | Lutton et al. | 73/862.34 |
| 4,602,515 | 7/1986 | Eichenlaub | 73/862.34 |
| 4,627,724 | 12/1986 | Cameron | 356/141 |
| 4,679,029 | 7/1987 | Krohn et al. | 340/347 P |
| 4,737,709 | 4/1988 | Loftus | 324/208 |
| 4,746,859 | 5/1988 | Malik | 324/208 |
| 4,763,533 | 8/1988 | Uitemarkt | 73/862.35 |
| 4,764,767 | 8/1988 | Ichikawa et al. | 340/870.31 |
| 4,790,175 | 12/1988 | Himmelstein | 73/1 R |
| 4,833,405 | 5/1989 | Richards et al. | 324/208 |
| 4,899,596 | 2/1990 | Janik et al. | 73/862.33 |
| 4,924,180 | 5/1990 | Nasr et al. | 324/207.15 |
| 4,947,035 | 8/1990 | Zook et al. | 250/225 |
| 5,086,272 | 2/1992 | Hinrichsen | 324/207.13 |
| 5,182,953 | 2/1993 | Ellinger et al. | 73/862.335 |
| 5,192,862 | 3/1993 | Rudd, III | 250/227.21 |
| 5,228,349 | 7/1993 | Gee et al. | 73/862.336 |

FOREIGN PATENT DOCUMENTS

| | | |
|---|---|---|
| 231633A1 | 11/1974 | Germany . |
| 2637960 | 3/1977 | Germany . |
| 3311945C2 | 7/1986 | Germany . |
| 3908248 | 9/1990 | Germany . |
| 58-111719 | 7/1983 | Japan . |
| 59-13906 | 1/1984 | Japan . |
| 62-42009 | 2/1987 | Japan . |
| 62-44603 | 2/1987 | Japan . |
| 1391713 | 8/1972 | United Kingdom . |
| 1303994 | 1/1973 | United Kingdom . |
| 2062875 | 5/1981 | United Kingdom . |
| 2079467 | 1/1982 | United Kingdom . |
| 2105475 | 3/1983 | United Kingdom . |
| 2151775 | 7/1984 | United Kingdom . |
| 2181246 | 4/1987 | United Kingdom . |

OTHER PUBLICATIONS

Welsh *An angular displacement transducer*, J. Phys. E; Sci Instrum., vol. 13, 1980, pp. 826–828.

*Primary Examiner*—Hezron E. Williams
*Assistant Examiner*—Ronald L. Biegel
*Attorney, Agent, or Firm*—Leonard L. Lewis; William E. Zitelli; Richard A. Romanchik

[57] ABSTRACT

Apparatus for determining static torque on a rotatable shaft includes at least two elements that when coupled to the shaft have a torque dependent relationship to each other; a sensor for detecting the torque dependent relationship when the shaft is under static load; and means for rotating the sensor about the shaft under static load and through an arc that is less than a full rotation about the shaft.

19 Claims, 4 Drawing Sheets

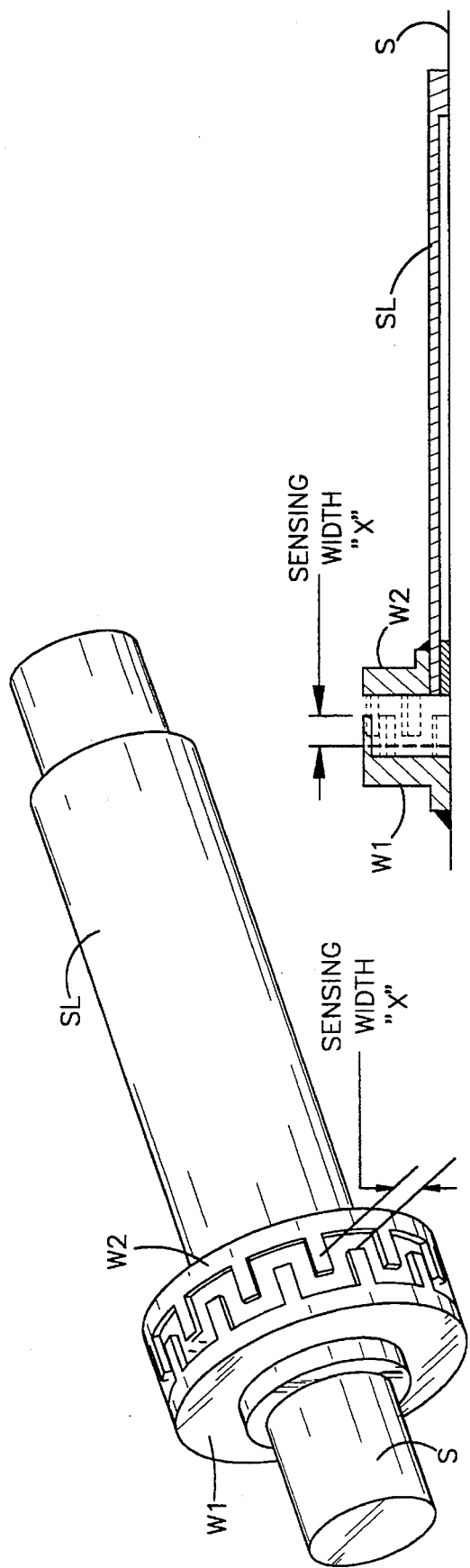
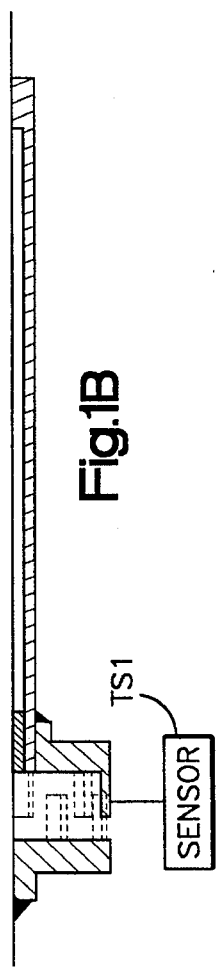
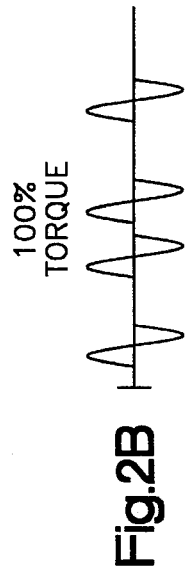
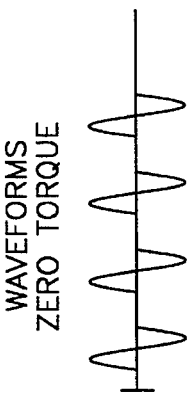

STATIC TORQUE MEASUREMENT FOR ROTATABLE SHAFT

BACKGROUND OF THE INVENTION

The invention relates generally to torque measurement and calibration for rotatable shafts. More particularly, the invention relates to torque measurement and calibration under static load conditions.

Apparatus for measuring torque on a rotating shaft, such as an engine drive shaft, are well known. One design that has been very successful is described in U.S. Pat. No. 3,548,649 issued to Parkinson. This apparatus uses two toothed wheels mounted to the shaft in spaced apart relationship. Each wheel has a plurality of axially extending spaced teeth that extend into spaces between the teeth of the other wheel, thereby forming an interlaced array of teeth. Each wheel is attached to the shaft at axially spaced locations so that the spacing between adjacent teeth varies as a function of the shaft torque. A monopole variable reluctance sensor is used to detect the teeth spacing as the shaft rotates.

In many applications, however, it would be desirable to measure static shaft torque. For example, if a static torque measurement can be made in a field site environment, the integrity of the shaft can be checked without having to spin the shaft. This is especially useful when the shaft is an engine drive shaft such as may be used with a gas turbine engine. Static load testing in the field can be used to obtain information such as modulus or twist of the shaft under static load, and this field data can then be compared to corresponding data obtained when the shaft was new, thereby providing information as to whether the shaft has yielded during field use.

The objectives exists, therefore, for a static load torque measurement apparatus and method for rotatable shafts that preferably can be used with a shaft installed in its normal operating environment.

SUMMARY OF THE INVENTION

To the accomplishment of the foregoing objectives, the invention contemplates in one embodiment apparatus for determining static torque on a rotatable shaft, comprising: means coupled to the shaft for producing a torque dependent condition; sensor means for detecting the torque dependent condition; and means for moving the sensor means past the means coupled to the shaft under static load to detect the condition.

The invention also contemplates the methods embodied in the use of such apparatus, as well as a method for determining torque applied to a rotatable shaft; comprising the steps of:

a. coupling a plurality of elements to the shaft such that the elements have a torque dependent relationship to each other when the shaft has a static torque applied thereto; and b. moving a sensor past the elements to detect the static torque dependent relationship; the sensor movement being performed through less than one revolution about the shaft.

These and other aspects and advantages of the present invention will be readily understood and appreciated by those skilled in the art from the following detailed description of the invention with the best mode contemplated for practicing the invention in view of the accompanying drawings.

BRIEF DESCRIPTION OF THE DRAWINGS

FIGS. 1A and 1B illustrate a conventional monopole torque measurement system used under dynamic conditions;

FIGS. 2A and 2B are exemplary representations of sensor signals produced under zero torque and 100% torque for the arrangement of FIGS. 1A and 1B;

DETAILED DESCRIPTION OF THE INVENTION

With reference to FIGS. 1A and 1B, a conventional torque measurement system includes a positionally fixed torque sensor, TS1, that is positioned near a rotatable shaft, S. The shaft may include a first toothed wheel, W1, that includes a plurality of circumferentially spaced teeth. A second toothed wheel, W2, is attached to the shaft by means of a sleeve, SL, at a location that is axially spaced from the attachment of the first toothed wheel W1. The teeth are arranged in an interlaced pattern with a spacing "X" that varies as a function of shaft torque. The sensor TS1 can be a magneto-optic type sensor, for example, that produces a signal in response to each passing tooth as the shaft rotates. As shown in FIGS. 2A and 2B, the time domain spacing of the pulses corresponds to the shaft torque. A detailed explanation of this arrangement can be found in the referenced U.S. Pat. No. 3,548,649 patent, the entire disclosure of which is fully incorporated herein by reference.

Figure 3B:
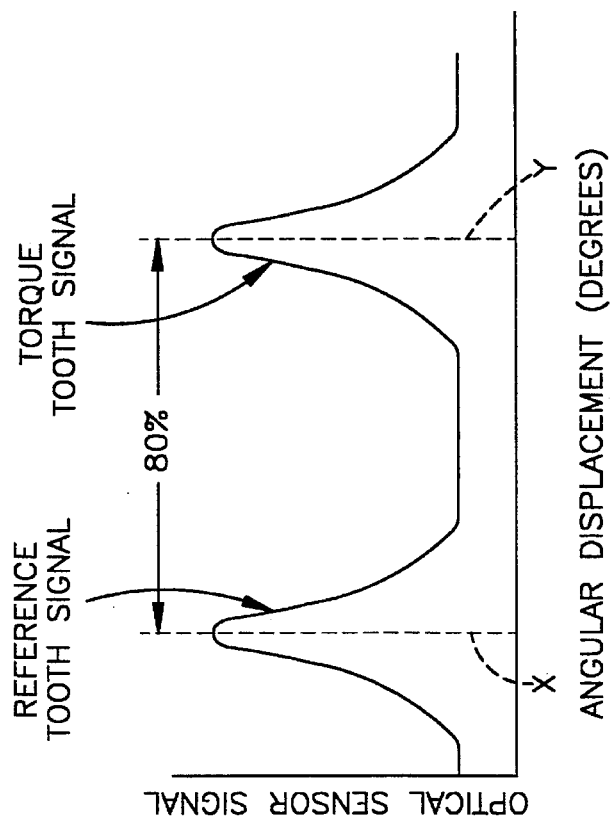
FIG. 3B is a representation of a typical sensor output signal produced during a torque measurement operation using the apparatus of FIG. 3A.
Figure 3A:
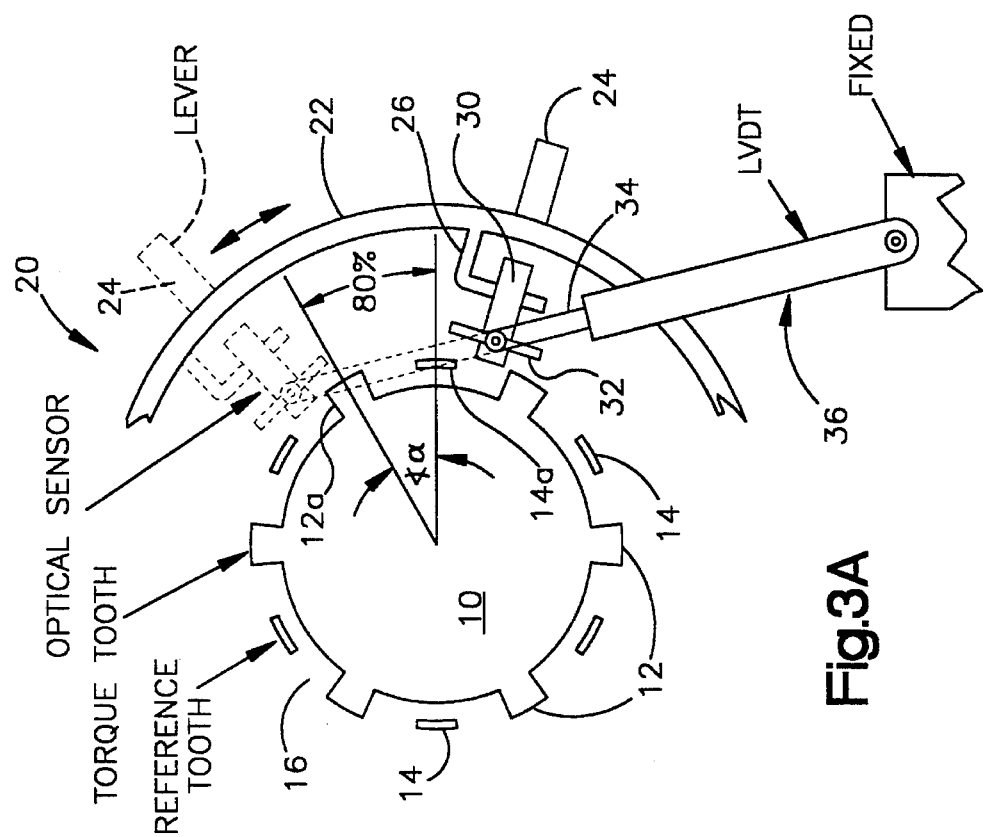
FIG. 3A is an end view of one embodiment of the invention.

With reference to FIG. 3A, I show an embodiment of the present invention. For convenience, the shaft and toothed wheel arrangement is represented in a manner similar to the arrangement of FIGS. 1A and 1B. However, this is intended to be exemplary only. Many other arrangements, such as those shown in U.S. Pat. Nos. 4,488,649 and 5,228,349, for example, can alternatively be used.

Although the invention is described herein with specific reference to the use of the invention with a turbine engine drive shaft, such as may typically be used on an aircraft, this description is intended to be exemplary only and should not be construed in a limiting sense. Those skilled in the art will readily appreciate that the invention can be used to monitor or measure static torque on any shaft arranged with detectable elements having a spatial relationship that corresponds to shaft torque.

The shaft 10 carries a first set of ferromagnetic teeth 12 which for convenience will be referred to herein as the torque teeth. A second set of ferromagnetic teeth 14, referred to herein as the reference teeth, can be attached to the shaft, for example, by means of a reference sleeve (not shown) in a manner similar to the arrangement of FIG. 1A. The reference teeth 14 are disposed so as to be positioned in spaces 16 between the torque teeth. Because the reference teeth and torque teeth are mechanically coupled to the shaft at axially spaced locations, the circumferential spacing between each reference tooth and its adjacent torque teeth will vary as a function of the applied shaft torque, as is well known.

In accordance with the invention, static shaft torque measurement can be realized by the use of a movable sensor assembly 20. In the embodiment of FIG. 3A, the assembly 20 includes a rotatable bracket member 22 that can conveniently be arcuate in shape to surround all or a portion of the shaft 10 near the teeth 12,14. The assembly 20 including the rotatable member 22 is preferably a stand alone unit that can be positioned in close proximity to the shaft 10 during work on the shaft or engine. For example, at a field site, the assembly 20 could be part of an engine test stand or other test assembly (not shown). Of course, the assembly 20 could be part of a permanent shaft installation if appropriate for a particular application. For example, in an industrial application, the assembly 20 could be permanently installed near a portion of a shaft that will be tested for static torque characteristics. In aircraft engine applications, of course, field testing will typically involve engine shafts on aircraft so that a mobile assembly 20 will often be appropriate.

The rotatable member 22 includes a hand lever 24 so that an operator can easily rotate the member through an arc that preferably is less than one full rotation about the shaft 10. For convenience, the member 22 can be disposed concentric with the central longitudinal axis of the shaft 10. In the embodiment of FIG. 3A, the member 22 is rotated through an arc such that a sensor will pass by at least one reference tooth and one torque tooth. Of course, depending on the application, it may be desirable to have the member 22 rotate through a longer arc length, but in its simplest form the rotation need only be enough to pass a sensor by two adjacent teeth. Although in many applications a rotational movement of the member 22 about the shaft will be an easy implementation of the invention, such rotational movement is not a requirement. So long as a sensor can be moved past the teeth in such as manner as to detect the position of the teeth relative to each other, thereby detecting the twist condition of the shaft under torque, other movement arrangements could be used.

A bracket arm or extension 26 is attached to the member 22 and supports a sensor 30 in close proximity to the teeth 12,14. The sensor 30 is also attached to a pivot arm 32 that is pinned or otherwise pivotally connected to a slider 34 that is part of a linear variable displacement transducer (LVDT) 36. By this arrangement, when the lever 24 is moved from the lower position (as viewed in FIG. 3A) to the upper position (shown in phantom in FIG. 3A), the sensor 30 moves past two of the teeth 12,14 as well as the gap 16 between those teeth. At the same time, the slider 34 extends out as also shown in phantom. Since the slider 34 defines a cord for the arcuate member 22, linear displacement of the slider 34 can easily be converted to angular position of the sensor as it is moved passed the teeth.

The sensor 30 can be selected from many different designs, but a preferred design is a magneto-optic sensor such as shown and described in U.S. Pat. No. 5,192,862 the entire disclosure of which is fully incorporated herein by reference. This sensor is particularly well-suited for use with the invention because it can produce an accurate output signal with respect to the teeth 12,14 positions without the use of polarizers and also without the need for a high speed motion of the sensor relative to the teeth.

As shown in FIG. 3B, the sensor 30 is configured to produce an output, such as a modulated light signal, that varies as a function of the sensor position relative to the ferromagnetic teeth 12,14. For example, from the initial sensor 30 position shown in FIG. 3A, as the lever 24 is rotated, the sensor first passes by a reference tooth 14a. The output signal from the sensor (FIG. 3B) peaks at X when the sensor 30 is adjacent the center of the tooth 14a. Similarly, another peak Y is produced as the sensor 30 passes by the torque tooth 12a to the position shown in phantom in FIG. 3A. Use of the magneto-optic sensor permits a slower manual rotation of the sensor past the teeth because the magneto-optic sensor works on the basis of modulating a light signal using a magnetic field that is modulated by the passing ferromagnetic teeth, as fully described in the referenced patent.

As described herein, the LVDT produces an output that corresponds to the angular position of the sensor 30 throughout its movement past the teeth 12a,14a. As a result, the precise spacing of the peaks X and Y can be determined. This spacing will vary as a function of the applied static torque and the shaft characteristics such as twist. A reference spacing of the peaks X and Y can be determined under a zero torque condition. The spacing between the X and Y peaks corresponds directly to the angular displacement between the centers of the teeth 12a and 14a, as graphically represented in FIG. 3A by the angle alpha ($\Delta\alpha$). In FIG. 3A, $\Delta\alpha$ represents, in an exemplary manner, a tooth spacing at about 80% applied torque.

The static torque data can be obtained for a shaft during the manufacturing process. Later, after the shaft has been in service, the data can be recorded again. The tooth spacing under similar static torque conditions can be compared to the original data to determine whether the shaft has yielded such as by comparing data on the shaft twist under static load conditions. For best results, the field static torque test should utilize the same reference and torque teeth 12a,14a used to collect the original static torque data.

The static torque measurement methods and apparatus in accordance with the present invention can thus be used in combination with other shaft calibration tests, if so desired. Advantageously, the static torque test can utilize the same toothed wheel configuration commonly used today for dynamic torque and speed measurement.

Figure 4B:
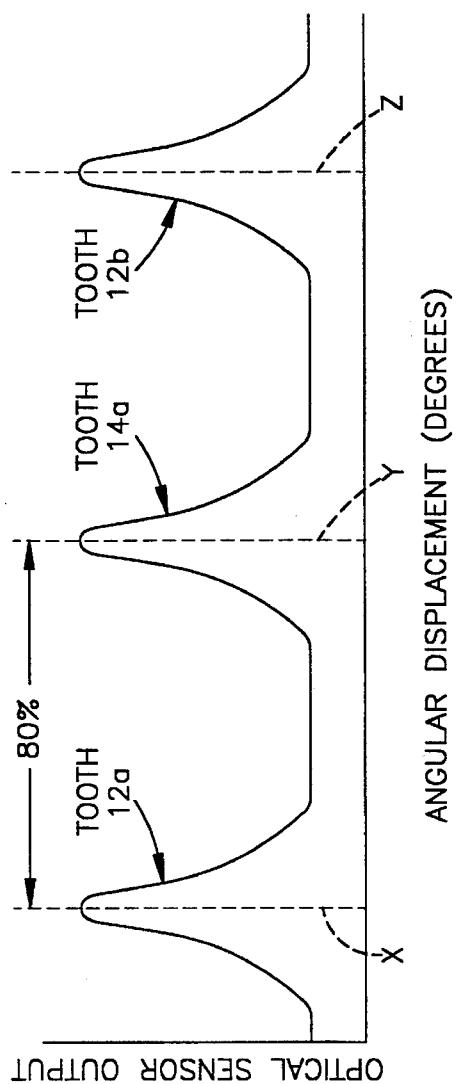
FIGS. 4A and 4B are similar to FIGS. 3A and 3B for another embodiment of the invention.
Figure 4A:
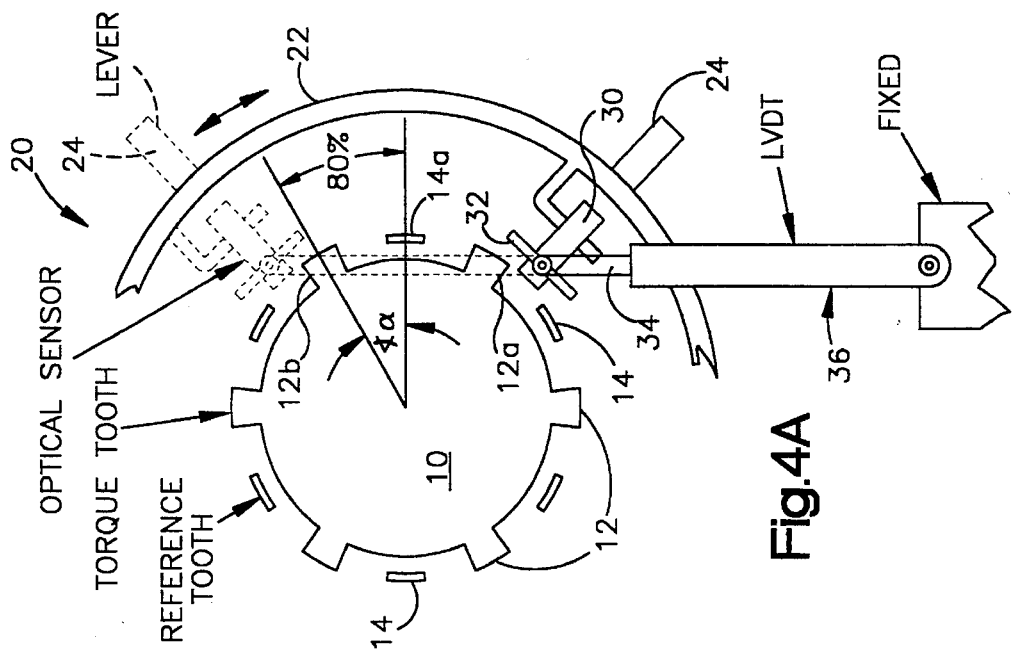

With reference next to FIGS. 4A and 4B, I show another embodiment of my invention. This arrangement is very similar to the arrangement of FIGS. 3A and 3B (like reference numerals designate like parts), except that in this embodiment, the member 22 is adapted to rotate through a larger arc length so that the sensor 30 passes by three teeth. In this case, the sensor 30 passes by two torque teeth 12a and 12b, and one reference tooth 14a that is interposed in the space between the torque teeth 12a and 12b. Alternatively, the sensor could be arranged to pass by two reference teeth and an interposed torque tooth.

By the arrangement in FIG. 4A, the sensor 30 produces three output signal peaks as represented in FIG. 4B. The first peak X corresponds to detection of the center of the first tooth 12a; the second peak Y corresponds to detection of the center of the tooth 14a; and the third peak Z corresponds to detection of the second torque tooth 12b. As with the embodiment of FIG. 3A, use of the LVDT 36 provides the absolute position of the peak Y (and hence the tooth 14a) with respect to the peak X (and Z).

A significant advantage of the invention is that it does not require a constant speed movement or rotation of the sensor 30 past the teeth. This permits manual operation of the movable assembly 20. However, if so desired, the member 22 could be driven by a mechanism (not shown) at a constant speed past the teeth. In such a case where the sensor is moved at a constant speed past three adjacent teeth, the LVDT would not be needed. For example, with reference to FIG. 4B, the spacing between the X and Z peaks is fixed. If the sensor moves past the corresponding teeth at a constant speed, the Y peak position can be determined under such constant speed conditions by simply using a clock to measure the relative time periods between the Y peak and the X or Z peaks. This can be done without the need for the actual value of the speed of movement. If the constant speed of movement of the sensor past the teeth is a known quantity, then the sensor could simply be passed by two adjacent teeth rather than three, and the LVDT would not be needed.

Those skilled in the art will readily appreciate that an LVDT is but one example of a transducer that could be used to determine the angular position of the sensor 30 at any moment in time. The member 22 could be equipped with a transducer that detects its rotation, or an optical transducer could be used, to name just two examples.

Figure 5:
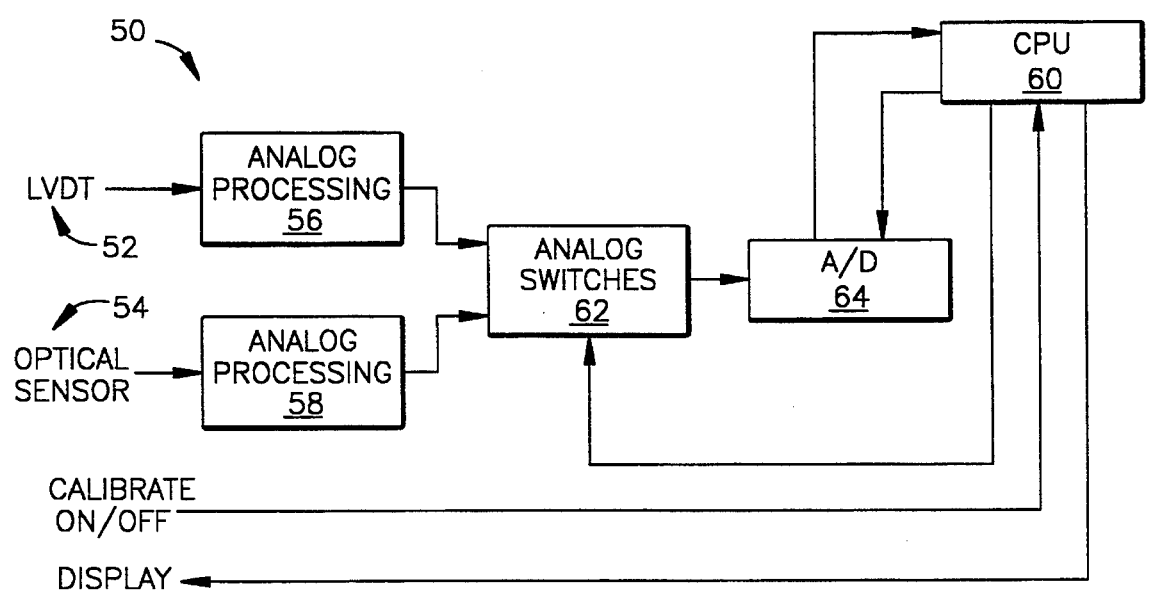
FIG. 5 is an electrical schematic in functional block diagram form of a control circuit suitable for use with the present invention.

With reference next to FIG. 5, I show an example of a control circuit 50 that is suitable for use with the invention. This circuit is only intended to be exemplary, and those skilled in the art will readily understand that the invention can be used with many different types of circuits depending on the particular application. The static calibrate function can easily be incorporated into an overall system controller design, or could be used as a stand alone test set.

In FIG. 5, the LVDT output signal 52 and the sensor 30 output signal 54 are input to respective signal conditioning circuits 56 and 58. These circuits may, for example, perform signal shaping, gain and so on as is well known. The optical signal conditioning circuit 58 may further include a photo-electric device to convert the modulated light output of the sensor 30 to a corresponding electrical signal, as is well known to those skilled in the art. The conditioned signals are input to a main CPU 60 by means of respective analog switches 62 and an analog to digital converter 64. Use of the analog switches under control of the CPU conveniently permits multiplex input to the CPU during static torque testing, if so desired. The A/D converts the analog signals to a digital format that can be processed by the CPU. The CPU can be programmed in a conventional manner to interpret the signals from the LVDT and the optical sensor 30 to determine the tooth spacing under various applied static torque conditions. Of course, as a stand alone test unit, a CPU would not be needed for the basic signal processing of the LVDT and sensor 30 outputs to determine the shaft twist/modulus and other characteristics under static torque.

The invention thus provides static torque measurement/calibration apparatus and methods for rotatable shafts that can conveniently be used in the field as well as during manufacture. The invention permits static torque measurements without the need to turn or spin the shaft, and can conveniently be implemented with only a partial rotation about the shaft.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. Apparatus for determining static torque on a rotatable shaft, comprising: at least two ferromagnetic elements that when coupled to the shaft have a torque dependent relationship to each other; a sensor for detecting said torque dependent relationship when the shaft is under static load; and means for rotating said sensor about the shaft under static load; said sensor comprising a magnetic field source and means to detect variations in said magnetic field as said sensor passes by said elements; said elements having a circumferential spacing from each other that is a function of shaft torque.

2. The apparatus of claim 1 wherein said rotating means comprises means for determining position of said sensor during rotation thereof.

3. The apparatus of claim 2 wherein said position determining means comprises an LVDT.

4. The apparatus of claim 3 wherein said LVDT detects linear movement of a rod coupled to said sensor.

5. The apparatus of claim 3 wherein said determining means further comprises a circuit that receives an output from said LVDT and an output from said sensor; said circuit producing an output that corresponds to the relative circumferential position of said elements with respect to each other.

6. The apparatus of claim 5 wherein said circuit output indicates the angular displacement of one of said elements with respect to the other element as a function of torque applied to the shaft under a static load.

7. The apparatus of claim 2 wherein each of said elements comprises ferromagnetic material; said elements being disposable about the shaft such that circumferential spacing of said elements corresponds to shaft torque.

8. The apparatus of claim 7 wherein said sensor comprises a magneto-optic sensor.

9. The apparatus of claim 7 wherein said sensor comprises a variable reluctance sensor.

10. The apparatus of claim 1 comprising at least three of said elements, wherein two of said elements are reference elements that are separated by a fixed distance, and a third element is disposed between said reference elements and has a circumferential spacing from the reference elements that varies with torque applied to the shaft.

11. The apparatus of claim 1 wherein said rotating means rotates said sensor less than a full rotation about the shaft.

12. A method for determining torque applied to a rotatable shaft; comprising the steps of:
  a. coupling a plurality of ferromagnetic elements to the shaft such that the elements have a torque dependent relationship to each other when the shaft has a static torque applied thereto;
  b. monitoring position of a sensor during rotational movement thereof about the shaft past said elements through less than one revolution about the shaft; and
  c. moving the sensor past said elements to detect said static torque dependent relationship.

13. Apparatus for determining static torque on a rotatable shaft, comprising: ferromagnetic means coupled to the shaft and having a torque dependent characteristic; sensor means for detecting said torque dependent characteristic; means to determine position of said sensor means during movement thereof; and means for moving said sensor means past said ferromagnetic means coupled to the shaft under static load to detect said characteristic.

14. The apparatus of claim 13 wherein said means coupled to the shaft comprises a pair of toothed wheels attached to the shaft at axially spaced locations.

15. The apparatus of claim 14 wherein said sensor means comprises a magneto-optic sensor that detects position of ferromagnetic teeth on said wheels as a function of static shaft torque.

16. The apparatus of claim 15 wherein said moving means comprises a rotatable frame that carries said sensor; said frame being manually operable.

17. The apparatus of claim 13 wherein said position determining means comprises an LVDT.

18. The apparatus of claim 17 wherein said LVDT is coupled to said sensor means and is actuated by said moving means.

19. The apparatus of claim 13 wherein said means for moving operates to move said sensor means at a constant speed past said coupled means.

* * * * *